US008553853B2

(12) United States Patent
Middleswarth et al.

(10) Patent No.: US 8,553,853 B2
(45) Date of Patent: Oct. 8, 2013

(54) SYSTEMS AND METHODS FOR USING THE ADVANCED INTELLIGENT NETWORK TO REDIRECT DATA NETWORK TRAFFIC

(75) Inventors: Susan M. Middleswarth, Silver Spring, MD (US); Jeffrey R. Evans, Lovettsville, VA (US); John H. Wurster, Basking Ridge, NJ (US)

(73) Assignee: Verizon Services Corp., Arlington, VA (US)

( * ) Notice: Subject to any disclaimer, the term of this patent is extended or adjusted under 35 U.S.C. 154(b) by 2069 days.

(21) Appl. No.: 11/608,675

(22) Filed: Dec. 8, 2006

(65) Prior Publication Data
US 2008/0137833 A1 Jun. 12, 2008

(51) Int. Cl.
*H04M 1/64* (2006.01)
(52) U.S. Cl.
USPC .................................. 379/88.01; 379/221.09
(58) Field of Classification Search
USPC .............................. 379/88.01–88.27, 221.09
See application file for complete search history.

(56) References Cited

U.S. PATENT DOCUMENTS

| | | | | |
|---|---|---|---|---|
| 5,875,394 A * | 2/1999 | Daly et al. | ..................... | 455/411 |
| 5,884,262 A * | 3/1999 | Wise et al. | ................. | 704/270.1 |
| 5,946,684 A * | 8/1999 | Lund | ..................................... | 1/1 |
| 5,982,870 A * | 11/1999 | Pershan et al. | ........... | 379/221.08 |
| 6,728,353 B1 * | 4/2004 | Espejo et al. | .............. | 379/114.2 |
| 6,751,306 B2 * | 6/2004 | Himmel et al. | .......... | 379/201.02 |
| 6,885,736 B2 * | 4/2005 | Uppaluru | ................... | 379/88.17 |
| 2004/0196966 A1* | 10/2004 | Bushnell | .................... | 379/88.19 |
| 2005/0015657 A1* | 1/2005 | Sugiura et al. | .................... | 714/6 |

* cited by examiner

*Primary Examiner* — Duc Nguyen
*Assistant Examiner* — Assad Mohammed

(57) ABSTRACT

A method and system are disclosed for providing a low cost mechanism for remotely re-routing queries in a telecommunications network. A service control point (SCP) executes an application which causes a queries to be launched over a LAN or WAN to a remotely located data center. A primary and secondary data center are defined, in which the secondary data center operations on a 'hot-standby' basis. Based on a manually provided indication, maintenance personnel may telephone and interact with a voice response unit or a web-based interface, which indicates that the SCP or SCP application should route queries to the secondary data center. Similarly, the same mechanism can be used to indicate that queries should be re-routed back to the primary data center. This allows remote management for controlling the queries without having to extensively modify the related infrastructure.

11 Claims, 4 Drawing Sheets

1

SYSTEMS AND METHODS FOR USING THE ADVANCED INTELLIGENT NETWORK TO REDIRECT DATA NETWORK TRAFFIC

BACKGROUND INFORMATION

The development of the Advanced Intelligent Network (AIN) has allowed telephone companies to offer various services that were heretofore difficult and expensive to develop. A variety of new services are possible by using the infrastructure of the AIN, including the ability to provide custom services to a subscriber at different locations.

The AIN architecture is dependent on network databases called Service Control Points (SCPs) that store data and programs used to control various switching structures in the telephone network. Originally, the design of the AIN anticipated that the SCPs would be flexible to meet future needs, and to a large extent that has occurred. Because the SCPs are used to provide enhanced services, the architecture was designed with redundancy. However, the SCPs are specialized processors, and fairly expensive relative to other types of processing equipment. Over time, the SCPs were required to interface with other types of databases and data centers. However, access to these databases and datacenters by the SCPs was not designed within the AIN architecture, and hence the robust reliability mechanisms were not readily applicable to the SCP-to-database/data center portion of the network. Thus, there is a need for flexible mechanisms to provide greater reliability and control in regard to the SCP accessing various databases and datacenters.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION

Exemplary embodiments are described more fully hereinafter with reference to the accompanying drawings, in which some, but not all embodiments of the inventions are shown. These exemplary embodiments are provided so that this disclosure will satisfy applicable legal requirements. Like numbers refer to like elements throughout. Although specific terms are employed herein, they are used in a generic and descriptive sense only and not for purposes of limitation.

Figure 1:
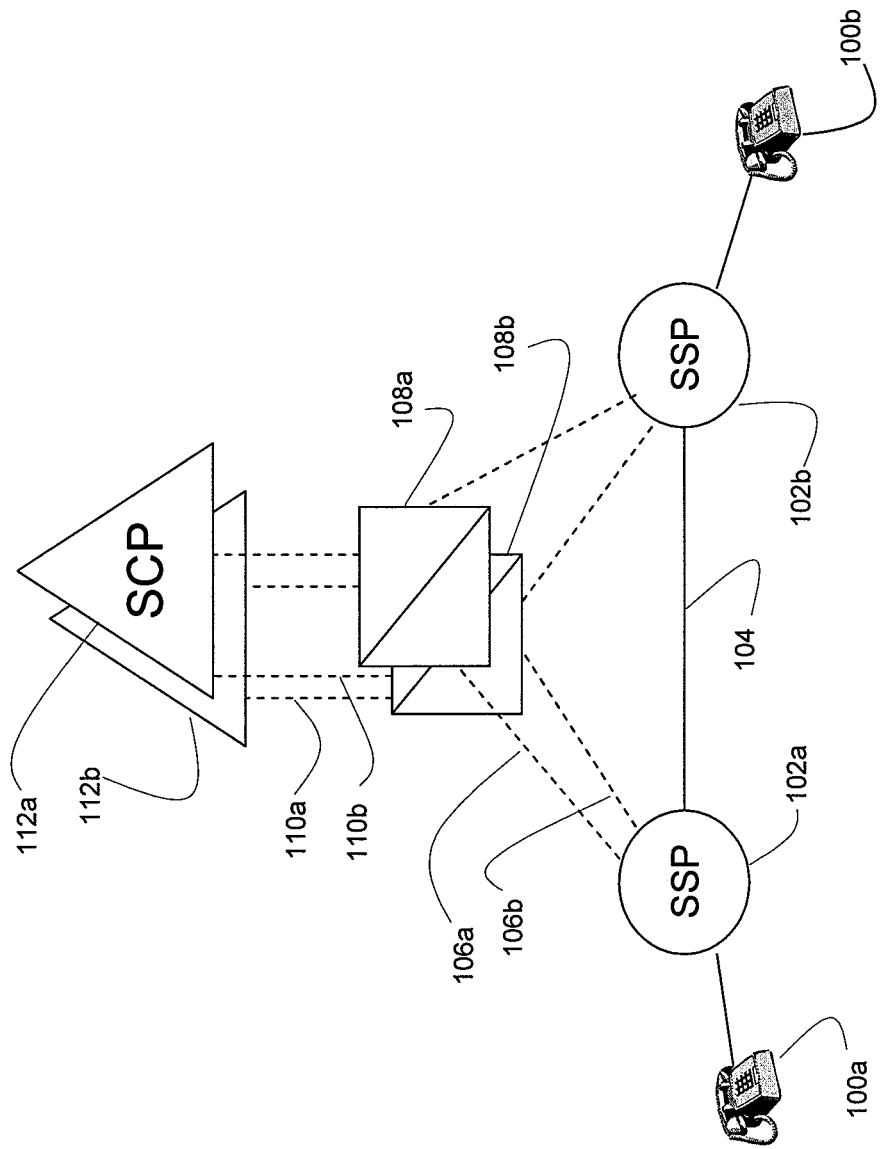
FIG. 1 illustrates an exemplary embodiment of the architectural components of an AIN.

In FIG. 1, illustrating an exemplary embodiment of a switching service point (SSP) 102*a*, 102*b* represent telephone switches capable of switching voice calls between users of the telephone network, represented via the telephone icons 100*a*, 100*b*. Although illustrated in terms of voice calls, the services used could be data, voice-over-IP, wireless, etc. The SSPs communicate using interoffice communication facilities 104, which typically are based on optical fiber communication, but again can utilize various other types of technology.

The SSPs use a signaling network, such as Signaling System No. 7 (SS7), which comprises Signaling Transfer Points (STPs) 108*a*, 108*b* for routing signaling messages to the various network elements. The STPS can be deployed in pairs, and each SSP is connected via signaling links 106*a*, 106*b* to each STP. Thus, if one of the STPs is unavailable, the mated STP in the pair is designed to seamlessly pick up the load.

The STPs are used to route signaling messages to a specialized database called a service control point (SCP). The SCP 112*a*, 112*b* is a combination database and application server, which can handle queries launched by the SSPs. It stores data for handling relatively simply queries, and also provides instructions to the SSP for executing more complicated call handling applications. The SCP communicates with the SSPs using an AIN protocol, and provides the appropriate information regarding how a call at the SSP should be handled. The SCPs are also deployed in mated pairs, so that if one is unavailable, the other can seamlessly pickup the load. This type of configuration is sometimes called an "active-active" configuration as both SCPs are typically running and handling queries. One complication of this type of architecture is that data that is updated on one SCP should be synchronized with the other SCP, since they are logically viewed as a single SCP.

As noted, the SCPs communicate to the SSPs using a standard AIN protocol, and execute custom applications designed around the AIN protocol. Because the SCPs control the SSPs and potentially impact millions of subscribers, they are thoroughly tested, and operate on a highly reliable processing platform. As can be expected, SCPs are fairly expensive, and their operation is controlled by the telephone company. It is imperative to the telephone network provider that these systems be "stable" and reliable. Consequently, the whole telecommunications architecture is designed to be tolerant of faults.

As a consequence, there is a tension between designing the SCPs to be flexible platforms that can accommodate new service offerings, and desiring the SCPs to be stable and reliable service platforms for providing services. Typically, stable and reliable service platforms are achieved by not adding new services (which frequently can cause unexpected problems). However, as they are also designed to be flexible service platforms, new applications should be readily accommodated, and this typically requires extensive testing.

One approach to achieving flexibility is to allow the SCPs to access data stored in traditional databases. This provides several benefits. First, there may be data already stored by a telecommunications service provider in databases for other reasons. Rather than duplicating the data in the SCP (which creates additional issues regarding data synchronization), the SCP may query the other database. Further, rather than expanding the data storage capabilities, or deploying additional SCPs (which are rather expensive), the existing SCPs can access the less expensive database systems.

Thus, it would be helpful for SCPs to access databases in datacenters using commonly available data communication networks. These standard databases typically do not accommodate the AIN protocols, nor are the data communications networks interconnecting them designed to be as reliable as the telecommunications networks.

Figure 2:
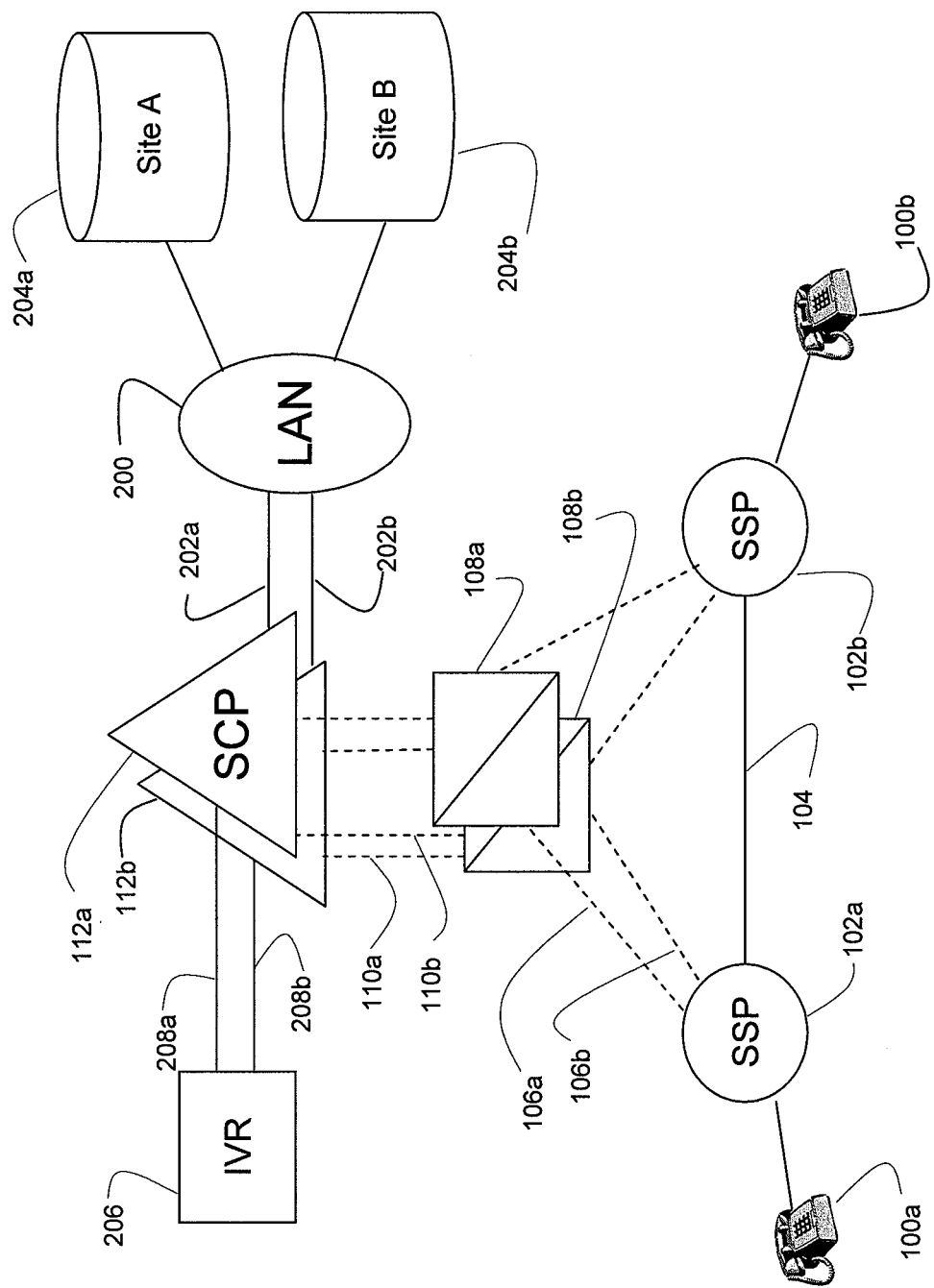
FIG. 2 illustrates an exemplary embodiment of two databases are accessed by the SCPs.

An exemplary embodiment for providing a flexible service architecture while maintaining stability via the SCPs is shown in FIG. 2. FIG. 2 shows one embodiment in which readily available database systems or servers 204*a*, 204*b* are accessible via a LAN 200 or other data communication network infrastructure for providing data to an SCP 112*a*, 112*b*. For reliability and other reasons (such as facilitating planned maintenance), the databases are deployed in pairs, so that if one database 204*a* is unavailable, the other 204*b* continues to run and provide data as needed to the SCP 112. Unlike the SCPs which operate in an "active-active" configuration, the off-site databases 204a, 204b operate in an "active-standby" mode. This means that data may be updated in Site A, but not necessarily updated in real time in Site B. Typically, data from Site A is used to periodically (or in near-real-time) update the data in Site B. The sooner that the alternative site is updated, the less likelihood there is for data synchronization problems to occur if there is a need to switch to the standby site, Site B. As for the LAN, it is not necessarily limited to any particular technology, and could implemented via a wide-area-network (WAN) or a metropolitan area network (MAN).

The SCPs can access the necessary data in the database by using the well known TCP/IP protocol. Thus, messages are sent from the SCP to the appropriate database using an IP address that identifies the primary site. For example, Site A 204a will have an IP address, IP1 distinct from Site B 204b, which would be IP2. In the event of a Site A becoming unavailable, the SCP should use the address for Site B. This requires each SCP to maintain a table of each IP address for a given application, which is duplicated on Site A and Site B. Maintaining a table with both IP addresses values is not by itself difficult. Functionality must be defined so that the SCP knows when to switch to using the alternative IP address.

In SS7, this functionality is provided in part by the STPs, which provide for 'alias' addressing. An alias address is an address which can be mapped to one of two other addresses, which can result in routing the message to one of two elements, based on which element is operation. Procedures are defined within SS7 for the automatic detection and failover in case of a link or network element failure and the use of an alias address. While these procedures could be incorporated into the SCP for communication to the datacenter, this would require functionality added to the LAN infrastructure and the databases. Customizing the operation of the LAN and database operation would negate part of the benefits of using readily available platforms for the LAN and the databases.

One approach is to provide a mechanism in the SCP allowing a manual redirection of messages to the backup database. This would direct the SCP to use the backup IP address. Essentially, a flag or other type of status indication provides information as to whether the primary or backup IP address would be used for messages sent from the SCP. Since it is presumed that the primary database is usually available, a manual mechanism would provide an effective cost/benefit solution of providing backup access with minimal infrastructure development cost. This would allow use of readily available LANs and databases, with minimal impact to the SCP functionality.

The mechanism for reconfiguring the SCPs to switch over from a primary site (e.g., Site A) to a secondary site, Site B, can be accomplished in multiple ways. One approach is to define procedures in the SCP application level program to detect failure at the application layer, and communicate the need to a management application to switch over to the secondary site. This approach requires the SCP application to be modified, and since an SCP may be executing several applications, each would have to be modified.

Another approach is to indicate the need to switch from the primary to the secondary data center via human intervention. The determination that there is a need to switch over is accomplished by a human, most likely in response to observation of other systems, notifications, alarms, or outputs. For example, alarms or other notifications may bring to the attention of a systems administrator that one of the data centers or databases is inoperable. The determination that a datacenter is unavailable can be due to a cataclysmic event, such as total failure of power, destruction of the premises (e.g., fire, tidal wave, earthquake, etc.), or can be a planned event (such as the primary data center being taken off line for maintenance or upgrading).

The human interaction can occur in a variety of ways. As shown in FIG. 2, an interactive voice response unit (IVR) 206 can be used to provide a man-machine interface allowing the caller to provide appropriate indicators as to which data site may be used. IVRs are well known in the area of telecommunications and provide prompts to a caller and receive DTMF signals in response. The IVR collects information and instructs the SCP to set the flag indicating whether the primary database is available or not. Various embodiments are possible, such as the IVR instructing the SCP to set a flag, which an application on the SCP then maps to an IP address, or the IVR could simply indicate which IP address should be used (primary or secondary).

Figure 3:
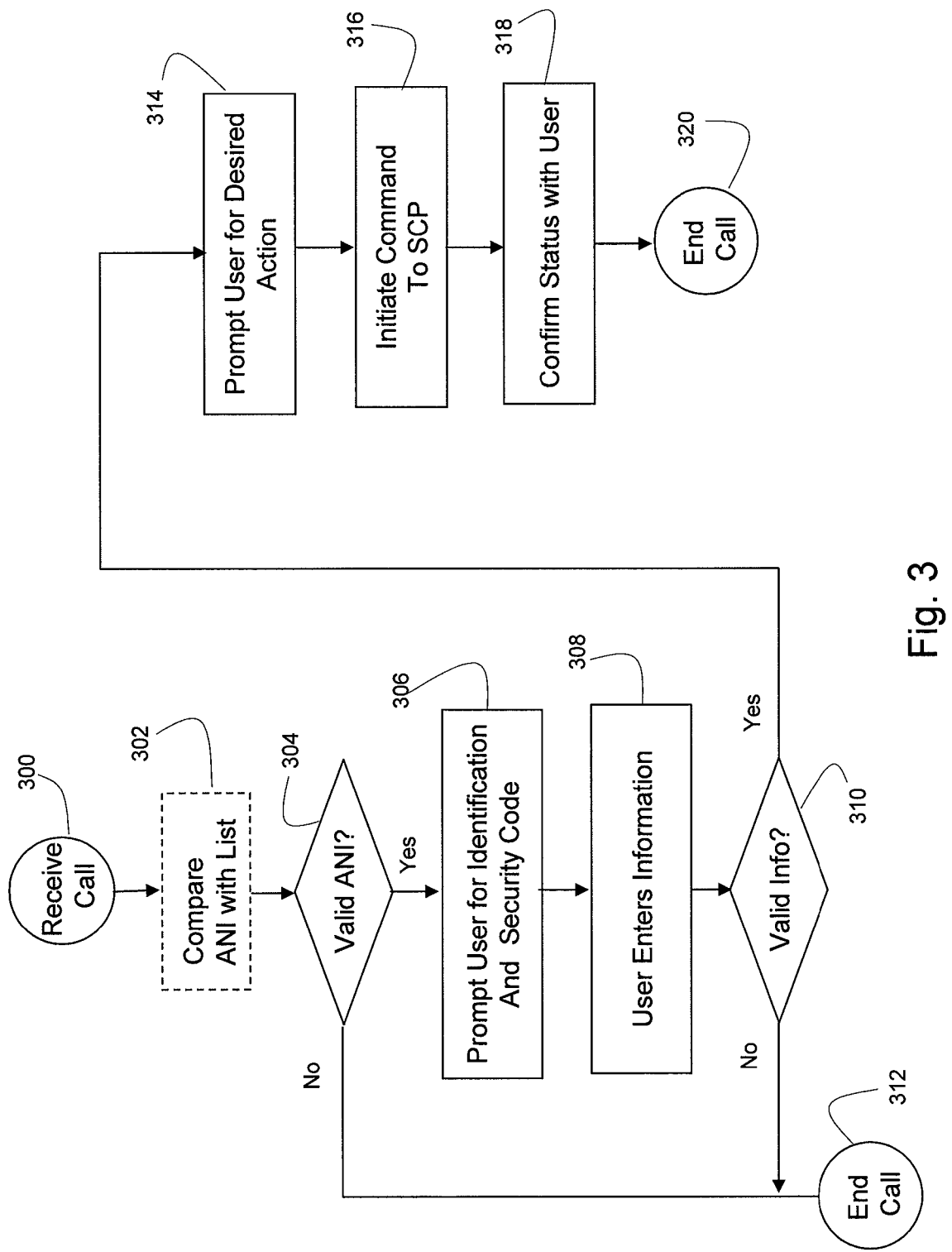
FIG. 3 illustrates an exemplary embodiment of a user interacting with a voice response unit.

Exemplary call flow for handling such an interaction is shown in FIG. 3, wherein the IVR process begins in step 300 by receiving a call from the public switched telephone network. In one embodiment, the ANI (calling party number) is compared with a list of values that represent authorized users that can request the change. This step 302 is optional, and represents one form of security mechanism. If the ANI is not on a list of approved callers, or other security mechanism indicates unauthorized access, the call ends at step 312. Otherwise, the IVR may prompt the caller for another level a security and/or identification code in step 306. The security code or user ID could be a simple alpha-numeric sequence, represented by DTMF tones. Other embodiments can use speech analysis for determining whether the user is authorized, which is compared against a file of authorized users' speech patterns. Other embodiments for authenticating the user are possible, and some may rely upon time-based passcodes entered by the caller, where the code is time-synchronized in the IVR. Because the IVR is reached by dialing a telephone number, even a non-published telephone number is susceptible to hackers attempting malicious entry.

In the next step 308, the user enters information and the system validates the caller. If the information is not validated, the call is ended at step 312. If the information is validated, the process continues with the user indicating the desired action.

The particular form of the prompts and responses can be designed in a number of ways. The user may be asked to select to use the primary or secondary site. Alternatively, the user may simply be asked whether the SCP would "toggle" and use whatever is the alternative database (whether primary or secondary). In another embodiment, the user could actually enter the numerical IP address value.

As a result of the user's input in step 314, the IVR then initiates a command to the SCP at step 316. The SCP processes the command, and then confirms acting on the request in step 318. The IVR, in turn, confirms the status with the user. At this point, the caller has accomplished the function of manually causing the SCP to redirect calls to another data center and the call is ended in step 320.

The IVR is one approach for allowing the user to indicate the switchover to the alternate data site. This approach can be embodied with other equipment, other than a dedicated IVR. For example, the SSP has functionality that can be controlled by SCP so as to provide an IVR-like functionality of providing prompts to a caller, authorizing information entered by the caller, and setting a flag based on analyzing the user's input. Essentially, the AIN infrastructure of the SCP and SSP can be defined to accomplish the SCP's switch over to a backup datacenter.

Another embodiment is to use a web-based interface for the user to manually indicate a switchover to a backup database. In this case, the user could log onto a secure web site, which prompts the user for identification, passcode, and/or other forms of security information. The user would then be prompted, via text or graphics, as to what data center should be used. The system could provide an immediate switch-over (as in the case of an unplanned outage of the primary data center) or the system could request a time for affecting the switch over (as in the case of a planned outage of the primary data center).

Figure 4:
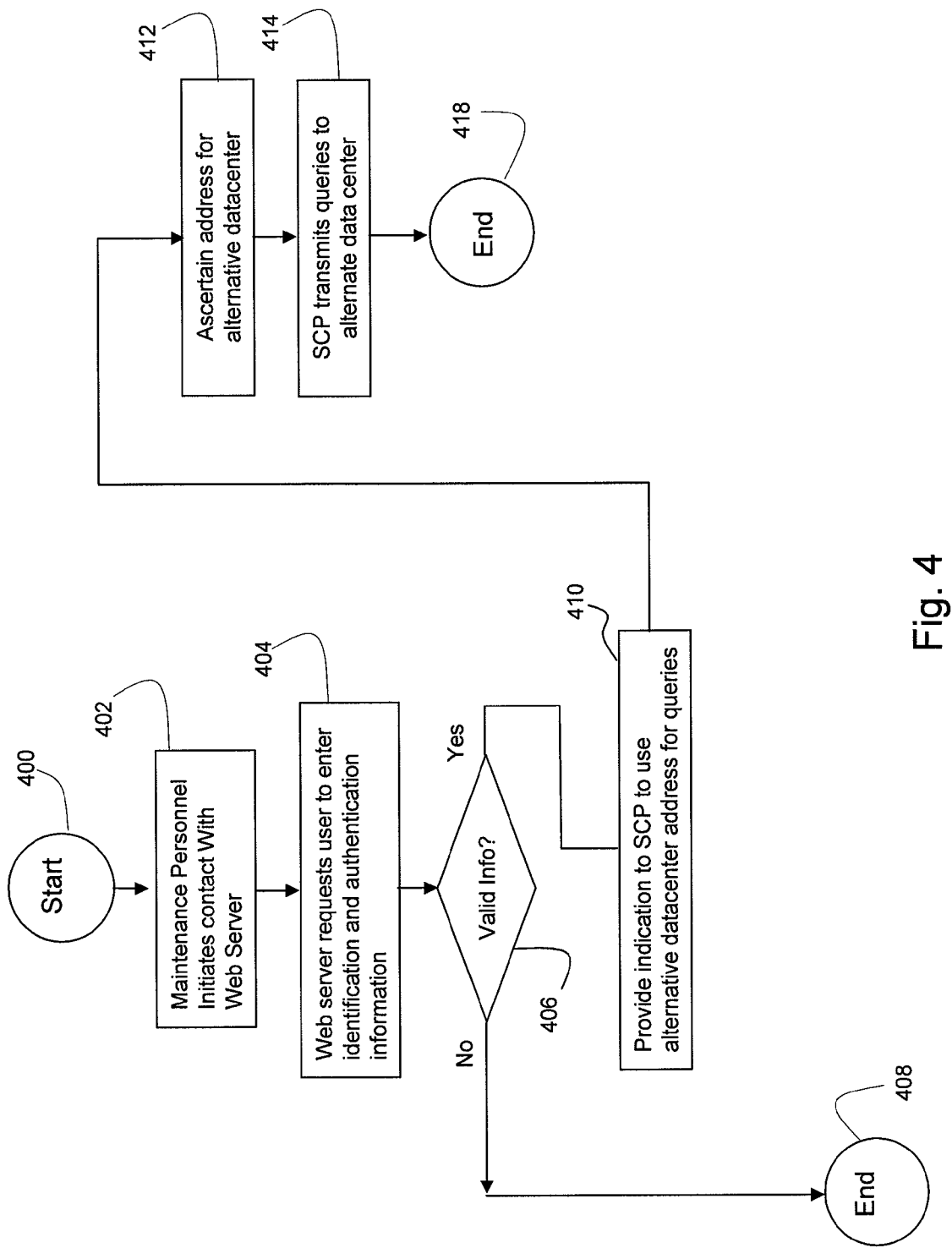
FIG. 4 illustrates an exemplary embodiment of a user interacting with a web-site.

FIG. 4 illustrates an embodiment using the web-based interface. The process begins at step 400 when the user, such as the appropriate maintenance or operations personnel, initiates contact with the web server 402. The interaction could occur using off-the-shelf web browsers and communication protocols, but other embodiments using other proprietary or standardized data communication protocols and methods can be used.

In the next step 404, the web server prompts the user to enter identification and authentication information. The information can be in various forms, including passwords, secret keys, digital signatures, secure protocols, the aforementioned time-synchronized numerical indicators, etc. The authentication and identification information may further be provided in multiple stages of interaction or prompting by the web-server. The web server may be able to authenticate the user locally, or may require remote access to other servers to access information necessary to validate the information provided by the user.

The next step 406 indicates the options available based on whether the information is validated by the web-server. If the information is not validated, then the communication may be terminated 408. In various embodiments, the user may be provided with multiple attempts, and the system may employ various well known security schemes in an attempt to block the same user after they have repeatedly failed.

Assuming that the information is validated, then an indication is provided in step 410 to the SCP from the web-server that a request was received for switching over to using the alternate datacenter. This indication can be conveyed in different methods, but typically is conveyed using a data communications network allowing the SCP to communicate with the web-server.

In the next step 412, the address for the alternative datacenter is ascertained. The web server may indicate the address to the SCP, or the SCP may retrieve the correct address from its own memory, or by querying another database. Regardless, in step 414 the SCP then transmits the queries to the alternative database using the updated address information. At this point, in step 418, the changeover to the alternative database can be considered completed.

Regardless of whether a voice or web-based interface is used, the same mechanism can be used to redirect queries to the secondary data center. Thus, when the primary data center is returned to an operation or on-line status, queries can be redirected via the same mechanism.

This provides an approach for quickly re-routing queries to a secondary data center, that is located outside of the public switched telephone network, without having to reprogram the service logic or having to modify the routing tables in routers. This new approach allows switchover to a secondary site even when communication links are operational from the SCP to the primary data center, but problems are encountered in the application layer, which the application may not be able to readily detect. This approach also allows maintenance personnel, who are trained to maintain the day-to-day operations, to maintain operation without having to involve trained support personnel who would otherwise have to be involved in ascertaining and correcting the problem. Further, the change can be made remotely, using any public telephone, which facilitates timely changeover without having to wait for authorized or trained personnel to be physically on-site.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
   receiving a call at an interactive voice response unit;
   receiving a request at the interactive voice response unit from a caller to redirect a query to be initiated at a service control point by switching from a service control point selected primary destination to an alternate destination selected by the caller;
   transmitting an instruction from the interactive voice response unit to the service control point that the query should be redirected to the alternate destination using an IP based communication protocol;
   ascertaining an IP address associated with the alternate destination; and
   transmitting the query from the service control point to the alternate destination using the IP address associated with the alternate destination.

2. The method of claim 1 further comprising the steps of:
   receiving a telephone number of the call at the interactive voice response unit;
   ascertaining the received telephone number is on a list indicating an authorized calling party telephone number; and
   in response to ascertaining the received telephone number is on a list indicating an authorized calling party telephone number, prompting the caller for the request of redirection of the query transmitted by the service control point.

3. The method of claim 1 further comprising the steps of:
   receiving an identification and a password from the caller;
   verifying the received identification and the password; and
   after verifying the received identification and the password, prompting the caller for the request of redirection of the query transmitted by the service control point.

4. The method of claim 1 further comprising the steps of:
   receiving a user identifier from the caller;
   receiving a time-synchronized numerical passcode from the caller; and
   verifying the time-synchronized numerical passcode from the caller with a second time-synchronized passcode associated with the user identifier.

5. The method of claim 1 further comprising the step of:
   prompting the caller to indicate whether the query should be directed to the alternate destination or the primary destination.

6. A system comprising:
   an interactive voice response unit capable of receiving a call from a caller and receiving a user identifier and password from the caller, the interactive voice response unit verifying the user identifier and password, and in response to a request of the caller to redirect a query from a service control point selected primary destination to a caller selected alternate destination, generating an indication of redirection;

a service control point, operatively connected to the interactive voice response unit, capable of receiving the indication of redirection and switching from an address of the service control point selected primary destination to an address of the caller selected alternate destination for initiating the query from the service control point; and a data center connected to a data communications network and capable of receiving the query indicating the alternate destination address, the data center capable of providing a response message in response to the query, the response message comprising data stored in the data center.

7. The system of claim 6 further comprising:

a second data center connected to the data communication network, the second data center storing a copy of the data.

8. The system of claim 6 wherein the interactive voice response unit further is capable of prompting the caller for a time-synchronized numerical passcode and verifying the time-synchronized numerical passcode provided by the caller with a second time-synchronized numerical passcode associated with the user identifier.

9. The system of claim 6 wherein the interactive voice response unit is capable of prompting the caller to indicate whether the query should be directed to the data center or a second data center.

10. The system of claim 6 further comprising:

a second service control point connected to the interactive voice response unit, the second service control point connected to the data communications network, the second service control point capable of receiving the indication of redirection and using the alternate destination address for initiating the query to the data communication network.

11. The system of claim 6 wherein the service control point initiates the query in response to receiving a second query from a service switching point connected to a service transfer point.

* * * * *